US00RE42601E

(19) United States
(12) Reissued Patent
Pernu et al.

(10) Patent Number: US RE42,601 E
(45) Date of Reissued Patent: Aug. 9, 2011

(54) METHOD AND SYSTEM FOR IMPLEMENTING A SERVICE IN A TELECOMMUNICATION NETWORK

(75) Inventors: Sakari Pernu, Tyrnävä (FI); Matti Malo, Oulu (FI); Keijo Hasa, Oulu (FI)

(73) Assignee: Spyder Navigations L.L.C., Wilmington, DE (US)

(21) Appl. No.: 11/958,699

(22) Filed: Dec. 18, 2007

Related U.S. Patent Documents

Reissue of:
(64) Patent No.: 6,978,005
Issued: Dec. 20, 2005
Appl. No.: 09/867,794
Filed: May 24, 2001

U.S. Applications:
(63) Continuation of application No. PCT/FI99/000985, filed on Nov. 26, 1999.

(30) Foreign Application Priority Data

Nov. 27, 1998 (FI) ..... F1982578

(51) Int. Cl.
*H04M 7/00* (2006.01)
*H04M 3/42* (2006.01)
*H04L 12/16* (2006.01)

(52) U.S. Cl. ..... 379/229; 370/264; 370/524; 379/18; 379/142.01; 379/142.03; 379/142.05; 379/201.01

(58) Field of Classification Search ..... 379/18, 379/93.23, 142.01–142.18, 201.01, 201.11, 379/229, 355.01, 218.01, 354; 370/264, 370/524

See application file for complete search history.

(56) References Cited

U.S. PATENT DOCUMENTS

| | | | |
|---|---|---|---|
| 4,633,041 | A | 12/1986 | Boivie et al. |
| 4,709,387 | A | 11/1987 | Masuda |
| 5,313,463 | A | 5/1994 | Gore et al. |
| 5,377,186 | A | 12/1994 | Wegner et al. |
| 5,490,251 | A | 2/1996 | Clark et al. |
| 5,937,040 | A | 8/1999 | Wrede et al. |
| 6,011,841 | A | 1/2000 | Isono |
| 6,292,548 | B1 | 9/2001 | Jreij et al. |
| 6,301,347 | B1 | 10/2001 | Tuokkola et al. |

FOREIGN PATENT DOCUMENTS

| | | |
|---|---|---|
| EP | 0 526 729 | 2/1993 |
| EP | 0 812 096 | 12/1997 |
| FI | 9294581 | 8/1992 |
| FI | 96955956 | 6/1996 |

(Continued)

OTHER PUBLICATIONS

Newton, H., "Newton's Telecomm Dictionary", Mar. 1998, pp. 683.

(Continued)

*Primary Examiner* — Harry S Hong

(57) ABSTRACT

The invention relates to a method for implementing a service in a digital multiple-service network comprising an exchange, a first telecommunication terminal connected to the multiple-service network via a first interface and a second telecommunication terminal connected to the multiple-service network via a second interface. In the method, the service is implemented using a server connected to the multiple-service network via a third interface, and the service information is transmitted to the second telecommunication terminal using channels reserved for signalling and a signalling protocol between the terminals and the exchange and between exchanges that comprises a limited amount of information not belonging to the call.

43 Claims, 4 Drawing Sheets

FOREIGN PATENT DOCUMENTS

Figure 1:
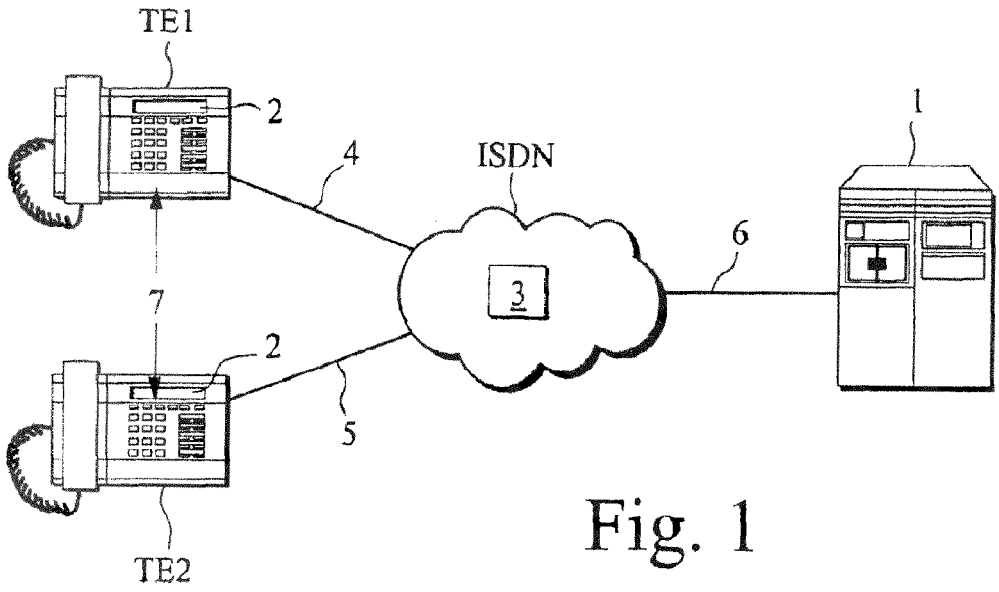

| | | |
|---|---|---|
| FI | 971716 | 4/1997 |
| JP | 06326774 | 11/1994 |
| WO | WO 97/06625 | 2/1997 |

OTHER PUBLICATIONS

ETS 300 050, "Integrated Services Digital Network (ISDN); Multiple Subscriber No. (MSN) supplementary service description", *European Telecommunications Standards Institute,* Oct. 1991, pp. 1-17.

ETS 300 051, "Integrated Services Digital Network (ISDN); Multiple Subscriber Number (MSN) supplementary service functional capabilities and information flows", *European Telecommunications Standards Institute,* Oct. 1991, pp. 1-20.

ETS 300 052-6, Integrated Services Digital Network (ISDN); Multiple Subscriber Number (MSN) Supplementary Services; Digital Subscriber Signaling System No. one (DSS1) Protocol; Part 6; Abstract Test Suite (ATS) and Partial Protocol Implementation eXtra information for Testing (PIXIT) Proforma Specification for the Network:, *European Telecommunications Standards Institute,* May 1997, pp. 1-31.

ETS 300 059, "Integrated Services Digital Network (ISDN); Subaddressing (SUB) Supplementary Service Description", *European Telecommunications Standards Institute,* Oct. 1991, pp. 1-15.

ETS 300 060 "Integrated Services Digital Network (ISDN): Subaddressing (SUB) Supplementary Service Functional Capabilities and Information flows", *European Telecommunications Standards Institute,* Oct. 1991, pp. 1-24.

ETS 300 061-6, Integrated Service Digital Network (ISDN); Subaddressing (SUB) Supplementary Service; Digital Subscriber Signaling System No. one (DSS1) Protocol; Part 6: Abstract Test Suite (ATS) and Partial Protocol Implementation eXtra Information for Testing (PIXIT) Proforma Specification for the Network:, *European Telecommunications Standards Institute,* May 1997, pp. 1-30.

ETS 300 196-6, "Integrated Services Digital Network (ISDN); Generic Functional Protocol for the Support of Supplementary Services; digital Subscriber Signallling System No. one (DSS1) Protocol; Part 6: Abstract. Test Suite (ATS) and Partial Protocol Implementation eXtra Information for Testing (PIXIT) Proforma Specification for the Network", *European Telecommunications Standards Institute,* Apr. 1998, pp. 1-34.

ETS 300 286-6, "Integrated Services Digital Network (ISDN); User-to-User Signalling (UUS) Supplementary Service; Digital Subscriber Signalling System No. one (DSS1) Protocol; Part 6: Abstract Test Suite (ATS) and Partial Protocol Implementation eXtra Information for Testing (PIXIT) Proforma Specification for the Network", *European Telecommunication Standards Institute,* Aug. 1998, pp. 1-40.

ETS 300 403-7, "Integrated Services Digital Network (ISDN); digital Subscriber Signalling System No. one (DSS1) Protocol: Signalling Network Layer for circuit-Mode Basic Call Control; Part 7: Abstract Test Suite (ATS) and Partial Protocol Implementation eXtra Information for Testing (PIXIT) Proforma Specification for the Network" *European Telecommunications Standards institute,* Apr. 1998, pp. 1-46.

Draft prETS 300 716, "Integrated Services Digital Network (ISDN); User Signalling Bearer Service (USBS); Service Description", *European Telecommunications Standards Institute,* Feb. 1996, pp. 1-18.

Draft EN 301 142-1 V.1.1.1 (Jan. 1998), "Integrated Services Digital Network (ISDN); User Signalling Bearer service (USBS); Digital Subscriber Signalling System No. one (DSS1) Protocol; Part 1: Protocol Specification", *European Telecommunications Standards Institute,* 52 pages.

The International Search Report for PCT/FI1998/00985 mailed on May 22, 2000.

U.S. Appl. No. 09/409,116, filed Sep. 30, 1999 (International Publication No. WO 98/48556).

METHOD AND SYSTEM FOR IMPLEMENTING A SERVICE IN A TELECOMMUNICATION NETWORK

Matter enclosed in heavy brackets [ ] appears in the original patent but forms no part of this reissue specification; matter printed in italics indicates the additions made by reissue.

[This is a continuation of Application No. PCT/FI99/00985, filed Nov. 26, 1999.] *This application is a Reissue application of U.S. Ser. No. 09/867,794, filed May 24, 2001, now U.S. Pat. No. 6,978,005, granted Dec. 20, 2005, which is a continuation of International Application No. PCT/FI99/00985, filed Nov. 26, 1999, which claims priority to Finnish Patent Application No. 982578, filed Nov. 27, 1998.*

FIELD OF THE INVENTION

The present invention relates to telecommunication systems, in particular to services implemented in a digital multiple-service network.

BACKGROUND OF THE INVENTION

A known technique used in a digital multiple-service network, such as e.g. the ISDN network (ISDN, Integrated Services Digital Network), is transmission of information between two predetermined subscriptions using computers provided with PC cards applicable for ISDN D-channel data transfer. However, such a procedure requires the setup of a separate connection between the subscriptions in question.

Another prior-art method is e.g. the one described in specification FI 971716, whereby information is transmitted to a telecommunication terminal by a technique in which the terminal functions as a passive party only receiving information independently, without requiring any actions on the ISDN user's part. In this case, the information provider activates the transmission without the receiver's acknowledgement. This arrangement can be used to direct advertising, marketing or similar information to certain target groups e.g. according to the location of subscriptions, which can be determined on the basis of subscriber numbers or on some other corresponding basis.

Moreover, a previously known solution in the ISDN system is to implement services in a telephone exchange or as a separate intelligent network application. In the GSM network (GSM, Global System for Mobile Communications), interactive services are implemented using short messages.

BRIEF DESCRIPTION OF THE INVENTION

The object of the present invention is to disclose a new type of method and system which can be used to implement in the user's telecommunication terminal interactive services/supplementary services or services/supplementary services producing added value.

The invention concerns a method for implementing a service in a digital multiple-service network comprising an exchange, a first telecommunication terminal connected to the multiple-service network via a first interface and a second telecommunication terminal connected to the multiple-service network via a second interface. In the method, the service is implemented by using a server connected to the multiple-service network via a third interface. The service information is transmitted from the server to the second telecommunication terminal through channels reserved for signalling and using signalling protocols between terminals and exchange (DSS1) and between exchanges (ISUP) that comprise a limited amount of information not belonging to the call.

In a preferred embodiment of the invention, the service information is transmitted as a text message, in another embodiment in a suitable information element. The service information is transmitted using UUS signalling in one embodiment, USBS signalling in another embodiment. UUS signalling (UUS, User-to-User Signalling) is an ISDN network supplementary service which allows two-way flow of information between two telecommunication terminals. The information channel used a signalling channel connected to the terminals. The information is transmitted in the network transparently, i.e. the network makes no changes in the information content. Neither does the network interpret the information or carry out any actions based on it. UUS signalling is described in ETSI (European Telecommunications and Standard Institute) standards of the ETS 300 286 series. USBS (User Signalling Bearer Service) is described e.g. in ETSI presentation prETS 300 716, the DSS1 protocol in recommendation draft EN 301 142 v.1.1.1 (1998-01). The text message is described in ETSI recommendation ETS 300 403.

In a preferred embodiment of the invention, a service provided by a server is distinguished by using multiple subscriber numbering. Multiple subscriber numbering (MSN) is a numbering practice used in a multiple-service network as an ISDN supplementary service in which, in addition to a main number, a number of terminal-specific identification numbers are defined for the basic subscriber interface. The other numbers differ only slightly from the main number, e.g. only the last digit is different. Multiple subscriber numbering is described in ETSI standards ETS 300 050, ETS 300 051 and ETS 300 052.

In an embodiment, a service provided by the server is distinguished by using subaddressing (SUB). Subaddressing is an ISDN supplementary service that allows the receiver of a call to expand his addressing capacity beyond a single ISDN network number. Subaddressing is described e.g. in ETSI standards ETS 300 059, ETS 300 060 and ETS 300 061.

In an embodiment of the method of the invention, the service is used to indicate telephone book information to a telecommunication terminal. The telephone book information presents e.g. the names and addresses of subscription holders in a telephone network, so the service can be used to make queries to obtain information from the telephone book.

In a preferred embodiment, the service is used to indicate A-party telephone book information to the B-party's telecommunication terminal. In this case, preferably from the B-party's telecommunication terminal a Facility message is sent to the exchange, a query for telephone book information regarding the A-party is sent from the exchange to the server and the telephone book information is sent from the exchange to thee B-party's telecommunication terminal. In an embodiment, the above-described function is performed using an Information message. The Facility and Information messages are described in conjunction with the DSS1 protocol. The telephone book information is preferably stored in conjunction with the terminal, e.g. in a terminal-specific list for later use.

Moreover, the invention concerns a method for transmitting the A-party's name to the B-party's telecommunication terminal in a digital multiple-service network. The multiple-service network comprises an exchange, a first telecommunication terminal, which belongs to the A-party and is connected to the multiple-service network via a first interface, and a second telecommunication terminal, which belongs to the B-party and is connected to the multiple-service network via a second interface.

In the method, a message comprising the A-party's telephone number is sent from the second telecommunication terminal to the exchange. This message is used to request telephone book information regarding the A-party, said telephone book information is retrieved in the exchange and sent from the exchange to the second telecommunication terminal using channels reserved for signalling as well as a signalling protocol between the terminals and the exchange and between exchanges that comprises a limited amount of information not belonging to the call.

The information between the second telecommunication terminal and the exchange is preferably transmitted using a Facility message in one embodiment and an Information message in another embodiment. The transmission of the A-party's name to the B-party's telecommunication terminal is preferably activated from a menu in the second telecommunication terminal. The telephone book information is stored in conjunction with the terminal.

The invention also concerns a system for implementing a service in a digital multiple-service network comprising an exchange, a first telecommunication terminal connected to the multiple-service network via a first interface and a second telecommunication terminal connected to the multiple-service network via a second interface. The system of the invention comprises a server connected to the multiple-service network via a third interface and means for transmitting service information between the server and the telecommunication terminal by using channels reserved for signalling and using a signalling protocol between the terminals and the exchange and between exchanges that comprises a limited amount of information not belonging to the call.

In an embodiment, the system comprises means for transmitting service information in the form of a text message; in a preferred embodiment the system comprises means for transmitting service information in a suitable information element intended for the service in question. The system preferably comprises means for transmitting service information using UUS signalling; in an embodiment, the system comprises means for transmitting service information using USBS signalling.

In an embodiment of the invention, the server comprises means for distinguishing a service by using multiple subscriber numbering in which, in addition to a main number, a number of terminal-specific identification numbers are defined for the basic subscriber interface. In an embodiment, the server comprises means for distinguishing a service via subaddressing. The system preferably comprises means for addressing telephone book information to a telecommunication terminal.

The system preferably comprises means for addressing A-party telephone book information to the B-party's telecommunication terminal, permitting e.g. the A-party to see the name of the B-party.

In an embodiment, the B-party's telecommunication terminal comprises means for sending a Facility message to the exchange, the exchange comprises means for sending a query for A-party telephone book information to the server and means for sending telephone book information to the B-party's telecommunication terminal.

In an embodiment, the B-party's telecommunication terminal comprises means for sending an Information message to the exchange, the exchange comprises means for sending a query for A-party telephone book information to the server and means for sending telephone book information to the B-party's telecommunication terminal. The terminal preferably comprises means for storing telephone book information.

Moreover, the invention concerns a system for transmitting A-party telephone book information to a B-party's telecommunication terminal in a digital multiple-service network comprising an exchange, a first telecommunication terminal belonging to the A-party and connected to the multiple-service network via a first interface and a second telecommunication terminal belonging to the B-party and connected to the multiple-service network via a second interface. In the system, the second telecommunication terminal comprises means for sending a message to the exchange, said message comprising the A-party's number and requesting telephone book information regarding the A-party. The exchange comprises means for retrieving A-party telephone book information and means for sending telephone book information to the second telecommunication terminal.

In the system, information is transmitted using channels reserved for signalling and a signalling protocol between terminals and exchange and between exchanges that comprises a limited amount of information not belonging to the call. In an embodiment, the system comprises means for transmitting information between the second telecommunication terminal and the exchange in a Facility message. The system preferably comprises means for transmitting information between the second telecommunication terminal and the exchange in an Information message. In an embodiment, the second telecommunication terminal comprises a menu for activating the transmission of A-party telephone book information. The menu may be e.g. a voice controlled menu or a visual menu used via the display of the telecommunication terminal. The telecommunication terminal preferably comprises means for storing telephone book information.

The invention makes it possible to utilize the fast and error-free data transmission and diversified signalling properties available in a multiple-service network. ISDN terminals are usually provided with large displays that make it easy to read even long messages via the terminal. By utilizing the invention, services need not be implemented in the telephone exchange; instead, a separate server connected to an interface can be used. If the modification of services or their activation in the exchange is performed sufficiently dynamically, e.g. via an analysis using different starting conditions, then services can be produced for the subscriber by simply modifying the server.

The invention also allows the subscriber to use various interactive services and services producing added value directly via a telecommunication terminal, without a computer. The service can also be utilized with a combination of a computer and a telecommunication terminal, in which case the computer connected to the telecommunication terminal allows easier, more diversified and more efficient use of the service. If the terminal connected to the multiple-service network additionally implements e.g. a PCI/CAPI interface (Programmable Communication Interface for ISDN/Common Application Interface), then it will be possible and relatively easy for the user to produce highly versatile applications of his own. The terminal does not require a switched connection, i.e. a B-channel connection such as e.g. via the Internet; instead, the service uses D-channel signalling services. This means avoiding the call charges for a switched call; especially saving the call start charge is a great advantage. As it is not necessary to set up an Internet connection either, the corresponding costs are also avoided. The invention can be applied without modifications in many terminals in a multiple-service network because the terminals usually implement e.g. a UUS signalling service.

LIST OF ILLUSTRATIONS

Figure 2:
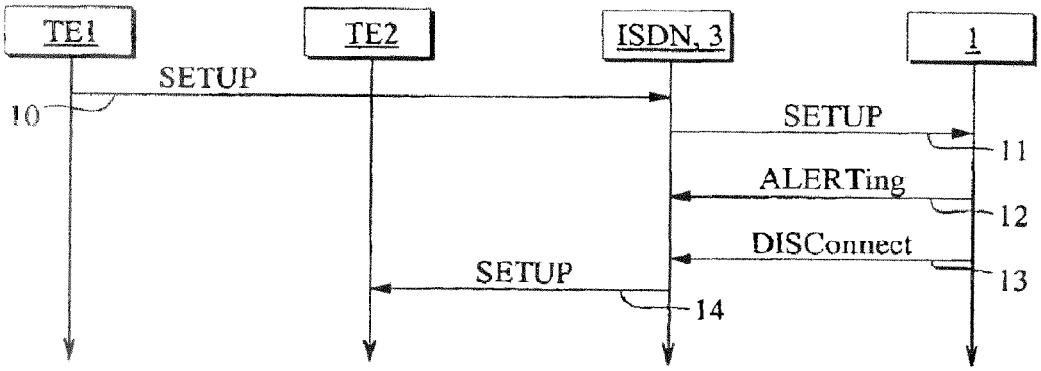
Figure 3:
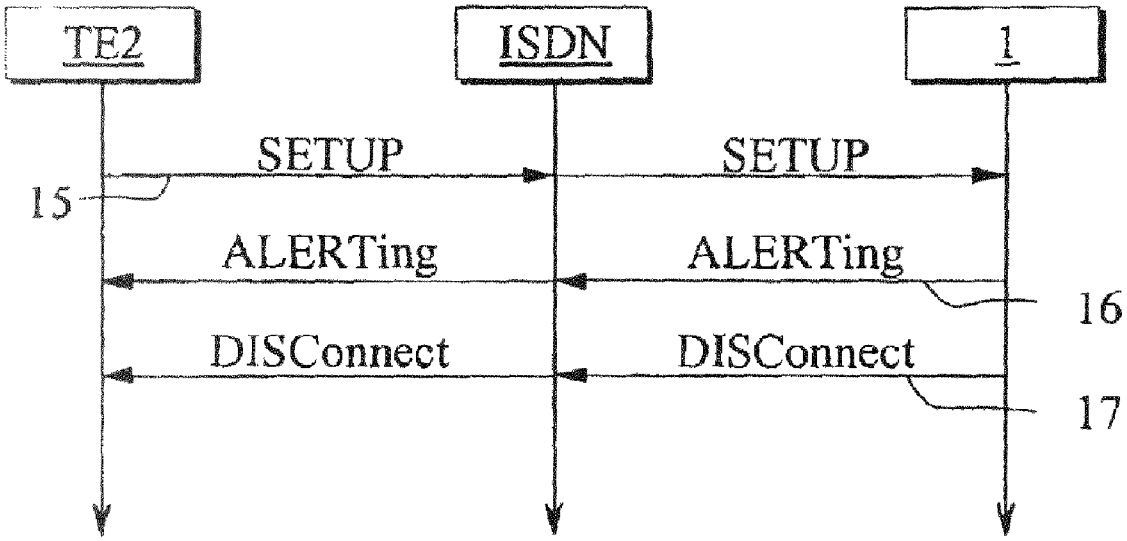
Figure 4:
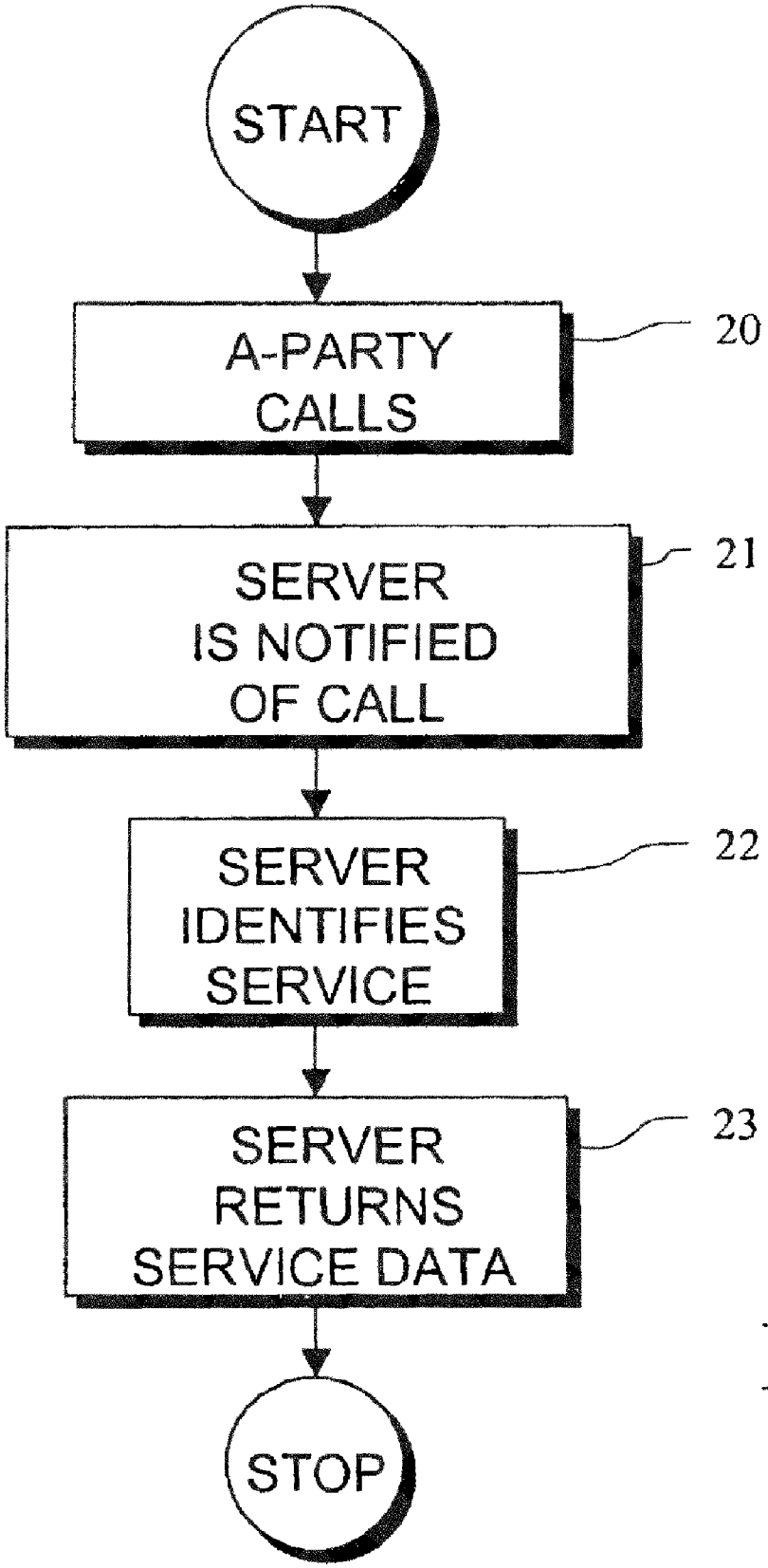
Figure 5:
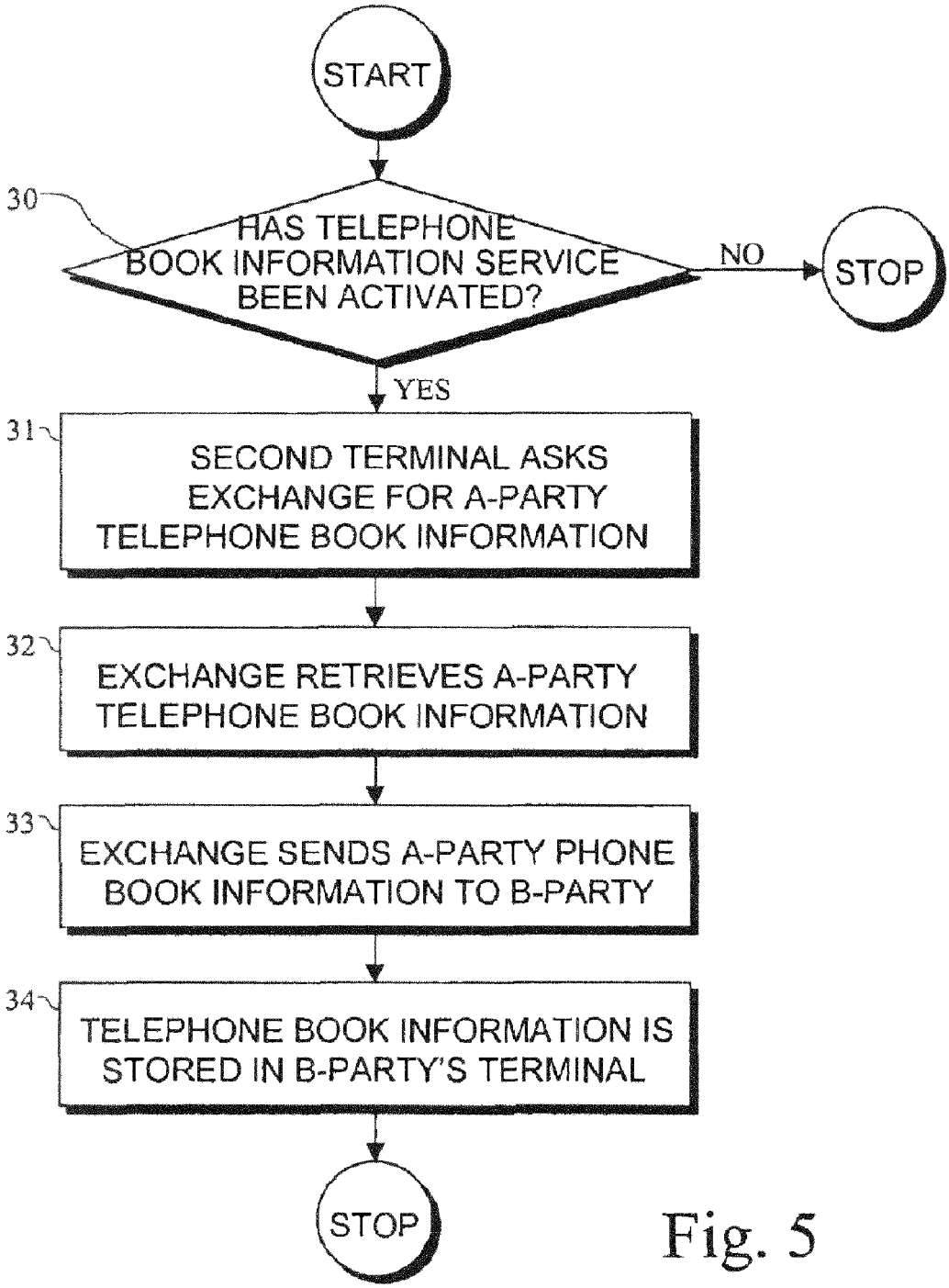

In the following, the invention will be described by the aid of examples of its embodiments with reference to the drawings, wherein FIG. 1 is a diagrammatic representation of a system according to the invention;

FIG. 2 presents a signalling scheme according to the invention;

FIG. 3 presents another signalling scheme according to the invention;

FIG. 4 presents a flow diagram representing a method according to the invention; and FIG. 5 presents a flow diagram representing another method according to the invention.

DETAILED DESCRIPTION OF THE INVENTION

FIG. 1 is a diagrammatic representation of a method according to the invention. The system comprises a digital multiple-service network ISDN and an exchange 3 belonging to the network. The ISDN network may comprise several exchanges, local and transfer exchanges. The exchanges are connected to each other using ISDN signalling (ISUP). Connected to the multiple-service network via a first interface 4 is a first telecommunication terminal TEI and via a second interface 5 a second telecommunication terminal TE2.

In the examples, the first telecommunication terminal TE1 belongs to the A-party, in other words, the call is started from the first terminal TE1. The second telecommunication terminal TE2 belongs to the B-party, i.e. the receiver of the call. Using ISDN signalling (DSS1), the A-party communicates with the originating exchange and the B-party communicates with the terminating exchange. The originating and terminating exchanges may be the same. Moreover, the system comprises a server 1, which is connected to the multiple-service network via a third interface 6. The server may communicate with any exchange in the ISDN network. The A-party, B-party and server may be connected to the same exchange. The interfaces 4, 5, 6 may be basic rate or primary rate interfaces as defined in the ISDN system, e.g. of the form 2B+D or 30B+D.

By means of the server 1, a service allowing the user of terminal equipment to use interactive services or receive in his/her terminal other information affording added value is implemented in the multiple-service network. The system comprises means for transmitting information between the server and the exchange or terminal equipment using a UUS or USBS service and/or in a suitable information element, and/or from the exchange to the user as a text message. These means comprise means for generating and sending a message, both in the telecommunication terminals, in the server and in the exchanges. Although in this example only two subscriber interfaces and only one exchange are presented, it is to be understood that the telephone network consists of a plurality of cells, subscriber interfaces and exchanges connected by links. It is also to be noted that ISDN is part of a telephone network which may comprise e.g. PSTN, PLMN/GSM and PSDN.

The above-mentioned methods for transmitting information have been standardized in the DSS1 (DSS1, Digital Subscriber Signalling No. 1) and/or ISUP (ISDN User Part) signalling. The DSS1 protocol is described e.g. in ETSI recommendation draft EN 301 142 v.1.1.1 (1998-01). The terminals TE1 and TE2 and the server 1 comprise means for implementing the above-mentioned functions. These means implement DSS1 signalling. The terminals TE1 and TE2 are provided with displays 2 to allow reading of messages and with keypads 7 to allow input of messages.

In addition, the server 1 comprises means by which a service requested by a terminal is distinguished using multiple subscriber numbering. The service requested is identified by the last digit or digits of the telephone number or numbers addressed to the server. Further, the server 1 comprises means for distinguishing the service by using subaddressing.

In one of the services provided by the server 1, the telephone book information concerning the holder of the subscriber interface for the first telecommunication terminal TE1 is addressed to the second telecommunication terminal TE2. In this case, the server 1 comprises means for addressing telephone book information to a telecommunication terminal. Stored in the server 1 is a database containing telephone book information. Moreover, the server 1 comprises means for carrying out database operations based on information received from a telecommunication terminal. In a service provided by the server, A-party telephone book information is addressed to the telecommunication terminal of the B-party. In this case, the exchange 3 comprises means for retrieving A-party telephone book information, e.g. the name of the calling party, from the server 1 and transmitting it to the second telecommunication terminal TE2, to the B-party.

In an embodiment, the second telecommunication terminal TE2 belonging to the B-party comprises a menu on the basis of which the query for the name is performed. In this case, the second telecommunication terminal also comprises means for requesting telephone book information from the exchange 3 or the server 1. The terminal makes the request for telephone book information using a Facility message. Together with the message, an invoke component is sent to enable the system to deliver the information to the terminal TE2. In other words, the data transfer is implemented using a new type of information element. The Facility message is described e.g. in ETSI standard ETS 300 196. In one embodiment, the corresponding functionality is implemented using an Information message. The service can be implemented using several different DSS1 message sequences.

FIG. 2 presents a signalling scheme according to the invention. In the example, the condition for starting the service is the number of the A-party TE1, on the basis of which the A-party's name is retrieved from the server 1 and sent to the B-party TE2. The A-party's telecommunication terminal TE1 sends a SETUP message to the exchange 3, arrow 10, whereupon the exchange 3 connected to the ISDN network starts connecting the call between the first terminal and the second terminal TE2. The exchange 3 may be any call control unit in the ISDN network, e.g. distributed in several parts of the network, such as originating, transfer or terminating exchange. In the ISDN network, both the calling number, e.g. 123123, and the called number, e.g. 321321, are transmitted.

The call control system in the ISDN network exchange 3 detects that a service, in the present example indication of telephone book information, has been activated for the B-party. The exchange 3 sends to the server 1 a SETUP message, arrow 11, to the number 112233 of the server 3, and the address "Telephone book" in a subaddress. In addition, the exchange 3 sends to the server 1 a UUS message requesting the server 1 to retrieve the name corresponding to the calling party number from the telephone book. The server 1 sends to the exchange 3 an ALERTing message, arrow 12, and in the ALERTing message a UUI information element (UUI, User-to-User Information) stating that it is retrieving information by the given search criteria.

The server 1 terminates the connection with the exchange 3 by sending a DISConnect message, arrow 13, with an UUI information element containing the A-party telephone book information, e.g. name and address. The exchange 3 sends to the B-party's telecommunication terminal TE2 a SETUP message, arrow 14, and the number of the A-party. The exchange 3 sends the A-party telephone book information to the B-party's telecommunication terminal TE2 e.g. in the form of a text message (Display), using the UUS service or in a suitable DSS1 information element, such as e.g. "calling party name". The service can be used e.g. to transmit address information in commercial transactions performed by telephone.

FIG. 3 presents a signalling scheme used in a situation where an interactive service is implemented from the second telecommunication terminal TE2. The service used in the example is a telephone book application in which the user of terminal equipment can make free-form telephone book queries. However, the format used to implement the query must be agreed beforehand between the service provider (Server) and the user (subscriber) or it must be a commonly agreed/standardized format.

The telecommunication terminal TE2 sends a UUI information element in a SETUP message via the ISDN network to the server 1, arrow 15. The message includes the number of the server 1, e.g. 112233, the subaddress "Telephone book" for indicating the service, and a UUS message "S:Pernu;E:S*". The service provider has made definitions such that the keyword "S" means surname and "E" means first name. In search functions, an asterisk * represents a wildcard character. The user has generated the UUS message using the keypad and display comprised in the telecommunication terminal TE2. By this search, the user is querying the telephone book to find all users with the surname "Pernu" and having a first name beginning with the letter "S".

The server 1 returns to the telecommunication terminal TE2 an ALERTing message containing a UUI information element indicating that it is performing the requested search, arrow 16. The server 1 sends to the telecommunication terminal TE2 a DISConnect message, arrow 17, for disconnecting the call, and in this message a UUI information element containing the requested information, e.g. "Pernu Sakari 123123 <crlf> Pernu Sari 321321".

FIG. 4 presents a flow diagram representing the steps comprised in a method according to the invention. At step 20, an A-party is making a call. The exchange detects that the A-party has a service activated, so the exchange connects the call to the server, step 21. The server identifies the service for the A-party on the basis of multiple subscriber numbering or subaddressing, step 22. The server returns the service information to the exchange and further to the A-party, step 23.

The flow diagram in FIG. 5 presents the steps comprised in another method according to the invention in a telephone book information service application. The execution of the method depends on whether the telephone book information service has been activated at step 30. If the service has been activated, then the next step 31 will be executed, otherwise the application is stopped. At step 31, the B-party telecommunication terminal requests the exchange for A-party telephone book information. The exchange retrieves the telephone book information entered for the A-party, step 32. The exchange sends the A-party telephone book information to the B-party, step 33. The telephone book information is stored in the B-party telecommunication terminal for later examination, step 34.

To sum up, let it be stated that the invention offers the user a new way of utilizing a telecommunication terminal in a multiple-service network. By applying the invention, e.g. services corresponding to the short message services available in the GSM network can be provided for wired-network subscribers as well.

The invention is not restricted to the examples of its embodiments described above, but many variations are possible within the scope of the inventive idea defined in the claims.

What is claimed is:

1. Method for providing telephone book information in a digital multiple-service network comprising an exchange, a calling subscriber telecommunication terminal connected to the digital multiple-service network via a first *integrated services digital network* (ISDN) interface, and a called subscriber telecommunication terminal connected to the network via a second ISDN interface, wherein after a call [being] initiated by a calling subscriber:

requesting calling subscriber telephone book information by sending from said called subscriber telecommunication terminal to said exchange a message requesting said calling subscriber telephone book information and comprising the number of said calling subscriber, said request being initiated by said called subscriber, in response to the received message, sending a query for said calling subscriber telephone book information from said exchange to a server implementing a telephone book information service, said server being connected to said multiple-service network via a third ISBN interface, in response to the received query, sending said calling subscriber telephone book information from said server to said exchange, *and* in response to the received calling subscriber telephone book information, sending said calling subscriber telephone book information from said exchange to said called subscriber telecommunication terminal using channels reserved for signaling and a signaling protocol comprising a limited amount of information not belonging to the call.

2. Method as defined in claim 1, wherein the calling subscriber telephone book information is transmitted in the form of a text message.

3. Method as defined in claim 1, wherein the calling subscriber telephone book information is transmitted in an information element comprising means for generating and sending a message, in both the calling subscriber telecommunication terminal and the called subscriber telecommunication terminal, in the server and in the exchange.

4. Method as defined in claim 1, wherein the calling subscriber telephone book information is transmitted using [UUS] *user-to-user* signaling.

5. Method as defined in claim 1, wherein the calling subscriber telephone book information is transmitted using [USBS] *user signalling bearer service* signaling.

6. Method as defined in claim 1, wherein the telephone book information service provided by the server is distinguished via multiple subscriber numbering in which, in addition to a main number, a number of terminal-specific identification numbers have been defined for the basic subscriber interface.

7. Method as defined in claim 1, wherein the telephone book information service provided by the server is distinguished by subaddressing.

8. Method as defined in claim 1, wherein said message sent from said called subscriber telecommunication terminal to said exchange is a Facility message.

9. Method as defined in claim 1, wherein said message sent from said called subscriber telecommunication terminal to said exchange is an Information message.

10. Method as defined in claim 1, wherein the calling subscriber telephone book information received by said called subscriber telecommunication terminal is stored along with said called subscriber telecommunication terminal.

11. Method as defined in claim 1, wherein said request is activated by said called subscriber from a menu in the called subscriber telecommunication terminal.

12. System for providing telephone book information in a digital multiple-service network comprising an exchange, a calling subscriber telecommunication terminal connected to the digital multiple-service network via a first *integrated services digital network* (ISDN) interface, and a called subscriber telecommunication terminal connected to the network via a second ISDN interface, the system comprising:

requesting means for requesting calling subscriber telephone book information by sending, from the called subscriber telecommunication terminal to said exchange, a message requesting said calling subscriber telephone book information and comprising the number of a calling subscriber, said request being initiated by said called subscriber;

first sending means for sending a query for said calling subscriber telephone book information from said exchange to a server implementing a telephone book information service, said server being connected to said multiple-service network via a third ISDN interface, *and* in response to the received message;

second sending means for sending said calling subscriber telephone book information from said server to said exchange, in response to the received query;

[third] *wherein the first* sending means *is further* for sending said calling subscriber telephone book information from said exchange to said called subscriber telecommunication terminal using channels reserved for signaling and a signaling protocol comprising a limited amount of information not belonging to the call, in response to the received calling subscriber telephone book information.

13. System as defined in claim 12, further comprising means for transmitting the calling subscriber telephone book information as a text message.

14. System as defined in claim 12, further comprising means for transmitting the calling subscriber telephone book information in an information element comprising means for generating and sending a message, in both the calling subscriber telecommunication terminal and the called subscriber telecommunication terminal, in the server and in the exchange.

15. System as defined in claim 12, wherein the system further comprises means for transmitting calling subscriber telephone book information using [UUS] *user-to-user* signaling.

16. System as defined in claim 12, wherein the system further comprises means for transmitting calling subscriber telephone book information using [USBS] *user signalling bearer service* signaling.

17. System as defined in claim 12, wherein the server comprises means for distinguishing the telephone book information service via multiple subscriber numbering in which, in addition to a main number, a number of terminal-specific identification numbers have been defined for the basic subscriber interface.

18. System as defined in claim 12, wherein the server comprises means for distinguishing the telephone book information service via subaddressing.

19. System as defined in claim 12, further comprising *third sending* means for sending said message from said called subscriber telecommunication terminal to said exchange as a Facility message.

20. System as defined in claim 12, further comprising *third sending* means for sending said message from said called subscriber telecommunication terminal to said exchange as an Information message.

21. System as defined in claim 12, further comprising means for storing the calling subscriber telephone book information received to said called subscriber telecommunication terminal with the called subscriber telecommunication terminal.

22. System as defined in claim 12, wherein the called subscriber telecommunication terminal comprises means for providing a menu to the called subscriber to activate the request.

*23. A method for providing telephone book information in a digital multiple-service network, the method comprising:*

*at an exchange,*

*receiving a request message requesting telephone book information for a calling subscriber device from a called subscriber device in response to a call from the calling subscriber device to the called subscriber device, wherein the request message is received using first integrated services digital network (ISDN) signaling over a digital multiple-service network, and further wherein the received request message includes a number associated with the calling subscriber device;*

*sending a query for the requested calling subscriber telephone book information to a server implementing a telephone book information service using second ISDN signaling over the digital multiple-service network, the query including the number associated with the calling subscriber device;*

*receiving a query response to the sent query from the server, the received query response including the requested telephone book information for the calling subscriber device; and*

*sending the requested telephone book information to the called subscriber device.*

*24. The method of claim 23, further comprising receiving a connect message from the calling subscriber device requesting a connection of the call.*

*25. The method of claim 23, wherein the requested telephone book information is sent in the form of a text message.*

*26. The method of claim 23, wherein the requested telephone book information is sent using user-to-user signaling.*

*27. The method of claim 23, wherein the requested telephone book information is sent using user signalling bearer service signaling.*

*28. The method of claim 23, wherein the received request message is a facility message.*

*29. The method of claim 23, wherein the received request message is an information message.*

*30. A method for providing telephone book information in a digital multiple-service network, the method comprising:*

*at an exchange,*

*receiving a connect message from a calling subscriber device requesting a connection of a call from the calling subscriber device to a called subscriber device, wherein the connect message is received using first integrated services digital network (ISDN) signaling over a digital multiple-service network, and further wherein the*

*received connect message includes a number associated with the calling subscriber device;*

*detecting that a service is activated for the called subscriber device, wherein the service provides telephone book information for the calling subscriber device;*

*sending a query, using second ISDN signaling over the digital multiple-service network, for the telephone book information associated with the calling subscriber device to a server implementing the detected service, the query including the number associated with the calling subscriber device;*

*receiving a query response to the sent query from the server, the received query response including the telephone book information associated with the calling subscriber device; and*

*sending the telephone book information associated with the calling subscriber device to the called subscriber device using third ISDN signaling over the digital multiple-service network.*

*31. The method of claim 30, wherein the exchange comprises a plurality of devices in communication using the digital multiple-service network.*

*32. The method of claim 30, wherein the query is a user-to-user signaling message.*

*33. The method of claim 30, further comprising, before sending the query, sending a setup message to the server, the setup message including an indicator of the detected service in a subaddress.*

*34. The method of claim 30, further comprising, before receiving the query response, receiving an alert message from the server, the alert message including a user-to-user information element indicating that the server is retrieving the telephone book information.*

*35. The method of claim 30, wherein the received query response is a disconnect message including a user-to-user information element containing the telephone book information.*

*36. The method of claim 30, wherein the telephone book information is sent to the called subscriber device in a setup message.*

*37. The method of claim 30, wherein the telephone book information is sent to the called subscriber device in the form of a text message.*

*38. The method of claim 30, wherein the telephone book information is sent to the called subscriber device using a user-to-user signaling service.*

*39. The method of claim 30, wherein the telephone book information is sent to the called subscriber device in a digital subscriber signaling number one information element.*

*40. A method for providing telephone book information in a digital multiple-service network, the method comprising:*

*at a server,*

*receiving a setup message from a subscriber device, wherein the setup message is received using integrated services digital network (ISDN) signaling over a digital multiple-service network, and further wherein the received setup message includes an indicator of a request for telephone book information in a subaddress and an identification of a search criteria associated with the request for telephone book information;*

*identifying telephone book information associated with the request; and*

*sending the identified telephone book information to the called subscriber device using the ISDN signaling.*

*41. The method of claim 40, further comprising, before sending the identified telephone book information, sending an alert message to the called subscriber device, the alert message including a user-to-user information element indicating that the server is retrieving the telephone book information.*

*42. The method of claim 40, wherein the identified telephone book information is sent in a disconnect message including a user-to-user information element containing the telephone book information.*

*43. The method of claim 40, wherein the identification of the search criteria is included in a user-to-user signaling service message.*

* * * * *

UNITED STATES PATENT AND TRADEMARK OFFICE

CERTIFICATE OF CORRECTION

PATENT NO. : RE42,601 E
APPLICATION NO. : 11/958699
DATED : August 9, 2011
INVENTOR(S) : Pernu et al.

It is certified that error appears in the above-identified patent and that said Letters Patent is hereby corrected as shown below:

Title page, item (30), under "Foreign Application Priority Data", in Column 1, Line 1, delete "F1982578" and insert -- FI982578 --.

Title page, item (56), under "Foreign Patent Documents", in Column 2, Line 3, delete "9294581" and insert -- 94581 --.

Title page, item (56), under "Foreign Patent Documents", in Column 2, Line 4, delete "96955956" and insert -- 955956 --.

Title Page 2, item (56), under "Other Publications", in Column 1, Line 11, delete "Part 6;" and insert -- Part 6: --.

Title Page 2, item (56), under "Other Publications", in Column 2, Line 3, delete "Signallling" and insert -- Signalling --.

Title Page 2, item (56), under "Other Publications", in Column 2, Line 4, delete "Abstract." and insert -- Abstract --.

Column 1, line 11, above "[This is a continuation of Application No. PCT/FI99/00985," insert -- *CROSS-REFERENCE TO RELATED APPLICATIONS* --.

Column 8, line 30, in Claim 1, delete "ISBN" and insert -- ISDN --.

Signed and Sealed this
Tenth Day of January, 2012

David J. Kappos

David J. Kappos
*Director of the United States Patent and Trademark Office*